Sept. 21, 1965  R. F. SHANNON  3,207,652
PHENOLIC COMPOSITIONS
Filed Dec. 29, 1960

INVENTOR.
RICHARD F. SHANNON
BY
ATTORNEYS

3,207,652
PHENOLIC COMPOSITIONS
Richard F. Shannon, Lancaster, Ohio, assignor to Owens-Corning Fiberglas Corporation, a corporation of Delaware
Filed Dec. 29, 1960, Ser. No. 79,210
4 Claims. (Cl. 161—93)

This invention relates to resinous compositions and particularly to improved phenolic compositions having properties which make the compositions especially suited for combination with fibers.

Resinous and rubbery products have been utilized in the past for bonding haphazardly arranged or oriented fibers into affixed relationship with respect to one another in an integral product. Phenolic resins, starch, urea-formaldehyde, melamine-formaldehyde, butadiene-styrene, butadiene-acrylonitrile, natural and synthetic rubbers, latices, asphalt and many other materials, either alone or in various combinations with each other or with other materials have been used as binders for fibrous products. Various treatments including many of those listed have been used also as treatments for protection of fibers against weathering, abrasion and other deteriorating forces. Fibers when gathered together in haphazard arrangements are bonded together by binder material which usually collects at fiber junctures and at fiber to fiber contact points. The binder collected at juncture points when advanced to a set condition provides an integral product which may be compressible because of the resilience of the fibers themselves. The fibers, even though they remain in the same bonded arrangement, are free to bend when the pack of fibers is compressed and then return to their former position when the compressive force which causes them to bend is removed. Many materials do not flow to fiber junctures but simply form globules on the fiber surfaces and give only haphazard inter-fiber bonding for this reason. Other materials flow readily over the fiber surfaces but do not provide a strong bond between fibers.

It has been found desirable to provide a binder for fibers which has a low viscosity and good flow characteristics before it is set but which advances to a strong, tightly adhering bond when advanced to a set condition.

It is an object to provide a binder that serves both as a protective treatment for the surfaces of fibers and as a binder for fibers.

It is a further object to provide a resinous composition which flows readily prior to completion of curing to a set condition and sets to a firm, resinous mass after curing.

It is also an object to provide an improved molding composition comprising fibers and resinous materials.

It is an object to provide foamable resin compositions which can be used as foam, slabs or other forms or can be utilized as a foamed binder or treatment for fibers and the like.

It has been discovered that a combination of a resole and a novolac phenolic resin provides novel and unexpected improvements in physical properties. Various combinations of a novolac resin and a resole resin in powdered, solvent or water emulsion form can be used. Such combinations are more fully explained in the following compositions which are set forth to illustrate the invention and the best mode of carrying out the invention but not to limit the scope of the invention. It has been found that combinations of novolac and resole resins can be used as binder compositions for fibers, molding compositions, and in systems which can be foamed to produce slabs, blocks, sheets or other forms or can be used as a foamed binder for fibrous products. Novolac and resole combinations although specifically designed as binders can also be used as molding compositions since their excellent flow characteristics allow low molding pressures and less expensive equipment to be used and provide excellent molding characteristics.

The novolac and resole resin combinations are especially suited as binder compositions since it has been discovered that they exhibit unusually good flow characteristics before cure and that they provide an especially tough bond after cure. The novolac and resole combinations have particular advantage as foamable compositions since the mixtures have reduced cure cycles over straight novolac resins and increased foam toughness after cure.

The ratio of novolac and resole resin can be varied widely dependent upon the properties desired and the end use. A high novolac-low resole ratio is preferred for molding and foaming. A low novolac-high resole ratio is the best for use in bonding materials such as fibers. Small amounts of novolac resin are added to a resole to improve the flow of the resin before cure. The improved flow is desirable in a resin binder composition so that the binder will flow to fiber junctures and into the interstices of the material being treated so that it can be most effective after cure. In binder compositions an excess of resole resin produces a better bond, cures faster and is readily adaptable for use in conventional glass fiber forming processes.

A large proportion of novolac resin is combined with the resole for molding and foaming purposes. A small proportion of resole is added to the novolac to reduce the viscosity of the mixture before cure which promotes flow and foamability and to provide a stronger and tougher foam or molded part after cure. It has been observed that upon application of heat to a resole-novolac mixture the viscosity drops sharply and then increases rapidly to solidification of the resin. The resin mixture flows well during the fraction of a second that the viscosity of the resin mixture dips to a watery consistency and then the resin mixture sets up to a solid resin in a short period to form a good binder. Most phenolic resins get gradually thicker as they are heated and do not exhibit the split-second reduction in viscosity of the improved resin mixes set forth below.

A novolac resin is a phenol formaldehyde reaction product prepared normally with an acid catalyst and less than one mole of formaldehyde per mole of phenol, which reaction product is characterized by phenol-ended chains that resemble dihydroxy diphenyl methane in structure. These reaction products are permanently soluble and fusible and cure only upon addition of a curing agent. Novolacs are normally referred to as two-stage resins since the first stage consists of the preparation of the resin and the second stage requires the addition of a curing agent such as hexamethylene tetramine to advance the resin to a cured state.

Resole resins are phenol formaldehyde reaction products prepared with an alkaline catalyst and an excess of formaldehyde to form compounds that resemble phenol alcohols. They are cured by the application of heat or/and acids. They are referred to as one-stage resins since heat can be added or removed to start and stop the cure any time between the addition of the formaldehyde and the final cure. These reaction products are characterized by having methylol side or end groups and by methylene bridges.

Three systems suitable for use as bonding and molding compositions have been developed, namely, powder, aqueous and solvent systems. In those cases where a powder is used, each particle of powder must be a complete unit in itself, i.e., it must contain both the resole and novolac resins as well as the cross-linking material which promotes the final cure and setting of the resin and any other materials such as coupling agents, fillers and the like. Aqueous systems are emulsified forms of novolac resin combined with an aqueous solution of the resole resin. Alcohol solution of both the resole resin and the novolac resin are used in solvent systems. The alcohol solutions can be prepared using powdered resin or using wet or dehydrated reaction products prepared from aqueous solutions.

*Example 1*

A composition suitable for use as a binder for fibers or as a molding composition is prepared as follows. A 70% by weight alcohol solution of a resole resin comprising the reaction product of 2.36 moles of formaldehyde per mole of phenol is prepared by mixing dehydrated phenolic resin with ethyl alcohol. Fourteen parts by weight of this alcohol solution of the resole resin is combined with 128 parts by weight of a 70% alcohol solution of a novolac resin prepared by reacting formaldehyde and phenol in a 0.75 to 1.0 molar ratio. To this mixture of alcohol solution is added 10 parts by weight of hexamethylene tetramine, which acts as the curing agent for the novolac resin, and also 8 parts by weight of denatured ethyl alcohol. Methyl alcohol can be used but ethyl alcohol has been preferred.

*Example 2*

Seventy-one parts by weight of a 70% alcohol solution of the resole resin of Example 1 is combined with 71 parts by weight of a 70% alcohol solution of the novolac resin of Example 1. To this mixture is added 6 parts by weight of hexamethylene tetramine and 8 parts by weight of denatured ethyl alcohol. Such a mixture can be used as a binder for fibrous products.

*Example 3*

To 127 parts by weight of a 70% alcohol solution of resole resin of Example 1 is added 16 parts by weight of a 70% alcohol solution of the novolac resin of Example 1. To this mixture is added 1.33 parts by weight of hexamethylene tetramine to form a binder which can be applied to fibers by spraying. This resin composition is suitable as a binder composition. The alcohol solutions of Examples 1, 2 and 3 require no special mixing procedures since the solutions readily mix with one another to form a new solution.

It has been found that the molar ratios of the resole resins to be used in admixture with novolac resins may vary from 1.5 to 2.75 moles of formaldehyde per mole of phenol and that the novolac resins may have molar ratios which vary from about 0.5 to 1.0 mole of formaldehyde per 1 mole of phenol. The molar ratio of the resole resins is preferably from 2.0/1 to 2.4/1 formaldehyde to phenol. The resins having the specified mole ratios may likewise be added one to another while they are in forms other than alcohol solution. The following examples illustrate further embodiments of the invention utilizing mixtures of novolac and resole resins which are not alcohol solutions.

*Example 4*

Ninety parts by weight of novolac resin comprising the reaction product of 0.75 mole of formaldehyde per mole of phenol in the form of a 40 mesh powder is heated until molten and then to this molten novolac resin is added 10 parts by weight of a 200 mesh resole resin comprising the reaction product of 2.36 moles of formaldehyde per mole of phenol and 10.8 parts by weight of hexamethylene tetramine. After mixing, the temperature of the melt is reduced until solidification takes place and the resultant material is broken up and ground to a desired particle size.

*Example 5*

Forty-six parts by weight of the novalac resin of Example 4 is melted and to this novolac resin is added 54 parts by weight of the 200 mesh resole resin of Example 4 and 6 parts by weight of hexamethylene tetramine. After complete mixing has taken place, the temperature of the melt is reduced until solidification takes place and the resultant material is broken up and ground to a desired particle size.

Powdered resole resin, if prepared by the dehydration of A stage resole resin (water soluble) which is then ground into powder, is normally a B stage or alcohol soluble material. Curing of the powdered B stage resin results in water being given off due to the condensation reaction. The 200 mesh B stage resole resin used in Examples 4, 5 and 6 is partially advanced but is not 100% resin solids since upon further advancement in cure some water will condense out.

*Example 6*

Nine parts by weight of the novolac resin of Example 4 is heated until molten and then to this molten novolac resin is added 91 parts by weight of the 200 mesh resole resin of Example 4 and 1 part by weight of hexamethylene tetramine. After complete mixing, the temperature of the molten mixture is reduced until solidification takes place. The solid material is then broken up and ground into a powder.

The particles of solid material from Examples 4, 5 and 6 are homogeneous in nature. Each particle of the powder of Example 4 contains resole, novolac, and hexamethylene tetramine in identical proportions. Each particle has all three ingredients, and in addition, contains these ingredients in the same proportion. The powdered products of Examples 4, 5 and 6 can alternatively be produced by mixing the ingredients while they are in alcohol solution, followed by removal of the solvent and complete dehydration to form a solid material which then can be ground to the desired particle size. The powder products can be utilized as binders, molding compound or can be foamed.

Aqueous systems can be utilized in forming binder compositions suitable for use on fibers. Aqueous solutions of a resole resin are combined with an aqueous emulsion of a novolac resin comprising 40% solids as follows:

*Example 7*

Twenty parts by weight of a resole resin comprising the reaction product of 2.36 moles of formaldehyde per mole of phenol in the form of a 50% aqueous solution is combined and thoroughly mixed with 200 parts by weight of the emulsion of a novolac resin prepared by reacting formaldehyde and phenol in a 0.75 to 1.0 molar ratio. Eleven parts by weight of hexamethylene tetramine powder is then prepared as an aqueous solution and this solution is added to the resole and novolac mixture. The resin composition is used as a binder composition which can be readily sprayed upon fibers.

*Example 8*

One hundred parts by weight of the resole resin of Example 7 in the form of a 50% aqueous solution is combined with 100 parts by weight of the novolac resin of Example 7 which is a 45% aqueous emulsion. This mixture is thoroughly agitated and then to the mixture is added 6 parts by weight of an aqueous solution of hexamethylene tetramine followed by further mixing. This liquid resin composition is sprayed upon fibers as they are formed and as they are collected and acts as a binder therefor.

*Example 9*

One hundred and eighty parts by weight of the resole resin of Example 7 which comprises a 50% aqueous solution is combined with 20 parts by weight of the novolac resin of Example 7 which is in the form of a 50% aqueous emulsion. After thorough mixing, 1.33 parts by weight of a hexamethylene tetramine aqueous solution is added to the novolac and resole mixture by further mixing.

In Examples 7, 8 and 9, the hexamethylene tetramine water solution may be varied in strength dependent upon how much dilution of the resin mixture is desired. Extra water can be used as the solvent for the hexamethylene tetramine if it is desirable to dilute the resin extensively prior to its use as a sprayable binder or the like. These water mixes are used as binders.

The compositions may comprise from 3 to 97% by weight novolac resin and from 97 to 3% by weight resole resin. The cross-linking agent such as hexamethylene tetramine is added in proportions of from 8 to 16% by weight based on the weight of the novolac resin component. Powdered binder compositions such as those of Examples 4, 5 and 6 can be applied with apparatus similar to that shown in U.S. Patent 2,936,479. In this apparatus, powdered binder is applied to fibers which are being formed in a rotary or centrifugal process wherein streams of molten glass are thrown outwardly from a spinner and then attenuated downwardly away from the spinner with a blast from a burner or blower. The powdered binders are applied in sufficient quantity to fiber packs so that the final product comprises from about 0.25% to 50% binder based on the total weight of the product. The aqueous system binders can be applied with spray nozzles directed into the forming hood of any conventional fiber forming process. The application of the phenolic binder is followed by treatment in a heating oven which advances the resinous components to a set condition. These sprayed binders are applied so that the final products are from about 0.5% to 50% by weight binder.

Such resin systems may be foamed and used as binder compositions or as foamed insulating sheets and the like. Examples of foamable compositions are as follows:

Example 10

Ninety parts by weight of novolac resin prepared by reacting formaldehyde and phenol in a 0.75 to 1.0 molar ratio was melted and maintained molten at a temperature not in excess of 110° C. To this molten novolac resin was added 10 parts by weight of a 200 mesh resole resin powder comprising the reaction product of 2.36 moles of formaldehyde per mole of phenol, 14 parts by weight of hexamethylene tetramine, 2 parts by weight of di-N-nitroso pentamethylene tetramine (Unicel ND) and 2 parts by weight of X–520 silicone which is an organo silicone fluid having a specific gravity of 1.03 at 25° C., a pour point of −34° F., a flash point (COC) of 505° F., and the following viscosities in centistokes at the specified temperatures, 900 at 77° F., 600 at 100° F., and 90 at 210° F. The materials added to the molten novolac were added and mixed rapidly and then the homogeneous mixture was cooled rapidly and after becoming solid was broken up and ground to the desired particle size.

Example 11

Using a similar mixing procedure and the resins set forth in Example 10, 50 parts by weight of 200 mesh resole resin, 8 parts by weight of hexamethylene tetramine, 2 parts by weight of di-N-nitroso pentamethylene tetramine, and 2 parts by weight of polyoxyethylene sorbitan monopalmitate were added rapidly with stirring to 50 parts by weight of molten novolac resin. After complete mixing, the material was cooled rapidly and after solidification, was broken up and ground into the desired particle size. A suitable particle size is from about 40 to 200 mesh. The polyoxyethylene sorbitan monopalmitate is a non-ionic emulsifier which helps control cell size of the foam. The powdered product when heated foams to form a slab; or when applied in proper proportions to fibers acts as a foamed binder; or the foamed material when applied in sufficient quantities entirely fills the interstices of a fibrous pack. In these foamed compositions the resole resin may be used in ratios of from 5 to 50 parts by weight and the novolac resin in a range of from 95 to 50 parts by weight. The foamed material may comprise from about 5% to about 85% by weight of the fiber and foam product.

Resole and novolac resin combinations which can be foamed to form foam objects or which can be used as binders or fillers for fibers are produced from alcohol solutions as follows:

Example 12

Twenty parts by weight of a 50% alcohol solution of a resole resin comprising the reaction product of 2.36 moles of formaldehyde per mole of phenol is combined with 130 parts by weight of a 70% alcohol solution of novolac resin prepared by reacting formaldehyde and phenol in a 0.75 to 1.0 molar ratio. In addition to the two main components, 11 parts by weight of hexamethylene tetramine, 2 parts by weight of di-N-nitroso pentamethylene tetramine, 2 parts by weight of X–520 silicone and 4 parts by weight of alcohol are also added to the mixture. This alcohol mixture can be used as a binder composition which is applied to fibers as they are being formed or applied to a pack of fibers after they are formed. When the fibrous pack is then heated in a curing oven, the binder composition foams.

Example 13

Eighty-three parts by weight of a 60% alcohol solution of the resole resin of Example 12 is mixed with 71 parts by weight of a 70% alcohol solution of the novolac resin of Example 12 along with 6 parts by weight of hexamethylene tetramine, 2 parts by weight of di-N-nitroso pentamethylene tetramine, 2 parts by weight of X–520 silicone and 8 parts by weight of alcohol. This alcohol solution can be used as a binder composition which is applied directly to fibers. The amount of alcohol added can be varied in order to adjust the viscosity of the alcohol solutions prepared in any of the examples above. Adjustment of viscosity may be necessary in order to handle the binder compositions with the spray guns or other suitable equipment to be used.

Either of the compositions of Examples 12 and 13 can be converted to a powder form by removing the solvent and water by heating the solution under a vacuum. The solid so formed can then be reduced into powdered form.

It has been found that the binder compositions comprising both novolac and resole resins have novel flow characteristics. These compositions have a low viscosity at room temperature and as they are first heated and then the viscosity increases very rapidly as the temperature is further increased above room temperature. As a result of this characteristic, the binder compositions flow freely as they are applied and when they are first heated in the curing oven and then they set up rapidly to form very strong resinous bonds.

Figure 1:
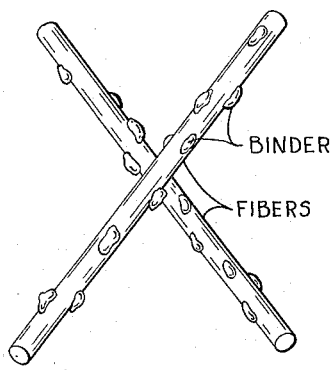
FIGURE 1 is a greatly enlarged view of intersecting fibers having particles of binder on the fiber surfaces.
Figure 2:
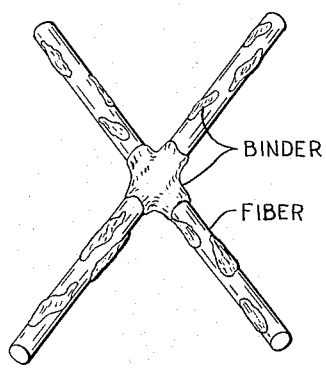
FIGURE 2 is a similar view of intersecting fibers having an excess of binder on the fiber surfaces, a part of the resin having collected at the contact point of the intersecting fibers.
Figure 3:
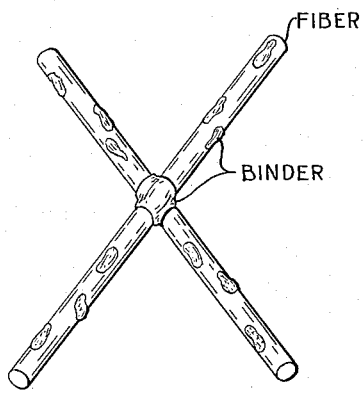
FIGURE 3 is a similar view of intersecting fibers having uniformly distributed binder thereon.
Figure 4:
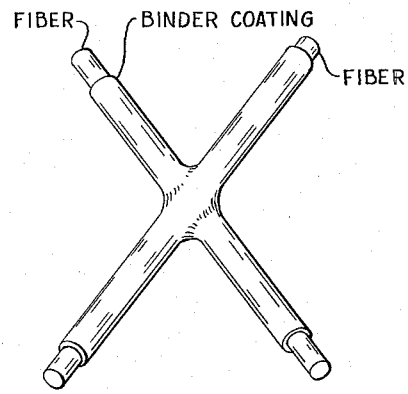
FIGURE 4 is a view of intersecting fibers having a continuous coating of binder on the fibers.

It is desirable to have some flow of the binder composition to fiber intersections in order to provide a bond between adjacent fibers in a pack of fibers. Although only two fibers are shown in these figures, as an actual matter, these figures of the drawing simply illustrate the manner in which binder distributes itself on fiber surfaces and is not illustrative of an actual pack of fibers which would obviously have many more fibers intertwined in a haphazard manner or oriented as criss-crossed or parallel fibers. The binder compositions of this invention are improved since they either flow readily to coat the surfaces of the fiber or they flow to the intersections of fibers to provide an adequate bond at these contact points of fibers. The arrangements shown in FIGURE 3 or 4 are preferred over those shown in FIGURES 1 and 2. In FIGURE 1 there has been little or no flow of the binder to fiber intersections but rather the particles of binder have simply formed upon the surfaces of the fibers and have remained as individual particles even after being cured. Any actual bonding is haphazard and many adjacent fibers would not be adhered one to another by the resin. In FIGURE 2, an excess of resin has collected at the intersection of the fibers; this condition is not preferred since it results in a waste of binder. A pack of fibers having good compressibility, resilience and integrity results when binder is applied and cured as shown in FIGURE 3. With binder at the junctures of fibers as shown here, the fibers are still free to bend and spring back along the length of the fiber between bonded contact points of adjacent fibers. The condition shown in FIGURE 4 is preferred only if the surface of the fibers must be protected against abrasion and chemical attack throughout the length of the fiber or might be preferred when the springiness of the pack is to be reduced over that normally attained when the fibers are bonded only at their intersections with adjacent fibers. The layer of resin on the entire fiber surface will tend to make the fiber resist deformation a little more than an uncoated fiber of the same dimension and composition.

One big advantage of the binders of this invention lies in the fact that they flow readily before cure so that they are highly efficient both in application and in actual use. The binder compositions not only flow readily before cure but set up to form a very strong bond once they are cured. The foamed compositions set forth, likewise flow readily before cure and form strong bonds after cure. In addition the foamed compositions will completely fill the interstices of a fiber pack if sufficient binder composition is added to saturate the pack. The addition of the novolac resin component has increased the flow time of the phenolic binder which makes it possible to gain greater efficiency of application of the binder to fibrous products. The cured resin is tougher, and for this reason, improved over conventional phenolic resin binders. The molding compositions are improved since an addition of resole resin to the novolac resin which already has excellent molding characteristics provides stronger molded products. The resole and novolac combinations are advantageously used in high strength glass reinforced phenolic molding compositions and in low cost mineral fiber and wood flour filled phenolic molding compositions. Better flow characteristics and lower molding pressures are advantages attained by the use of the novolac-resole combinations.

Various modifications can be made without varying the scope of the invention as defined in the accompanying claims.

I claim:
1. Mineral fibers bonded together by a phenolic resin composition comprising from 97–3% by weight of a resole resin, from 3–97% by weight of a novolac resin and from 8–16% by weight of hexamethylene tetramine based upon the weight of the novolac resin, said resinous composition comprising from 0.25–50% of the total weight of mineral fiber and phenolic resin composition.

2. Mineral fibers bonded together by a resin composition comprising from 97–3% by weight of a phenol formaldehyde reaction product prepared by reacting formaldehyde with phenol in a molar ratio of from about 1.5–1.0 to about 2.75–1.0, from 3–97% by weight of a phenol formaldehyde resin prepared by reacting formaldehyde and phenol in a molar ratio of from about 0.5–1.0 to about 1.0–1.0, and from 8–16% by weight of hexamethylene tetramine based upon the weight of the latter phenol formaldehyde reaction product, said resin composition comprising from 0.25–50% of the total weight of mineral fiber and resin composition.

3. Mineral fibers uniformly combined with a foamed phenolic resin composition comprising from 95–50 parts by weight of a novolac resin, from 5–50 parts by weight of a resole resin, and from 8–16% by weight of hexamethylene tetramine based upon the weight of the novolac resin, said foamed phenolic resin composition comprising from 5–85% by weight of the total weight of the mineral fibers and foamed phenolic resin composition.

4. Mineral fibers uniformly combined with a foamed resin composition comprising from 95–50 parts by weight of a phenol formaldehyde resin prepared by reacting formaldehyde and phenol in a molar ratio of from about 0.5–1.0 to about 1.0–1.0, from 5–50 parts by weight of a phenol formaldehyde resin prepared by reacting formaldehyde and phenol in a molar ratio of from about 1.5–1.0 to about 2.75–1.0, and from 8–16% by weight of hexamethylene tetramine based upon the weight of the first phenol formaldehyde resin, said foamed resin composition comprising from 5–85% by weight of the total weight of the mineral fibers and foamed resin composition.

References Cited by the Examiner
UNITED STATES PATENTS

| | | | |
|---|---|---|---|
| 2,527,581 | 10/50 | Shearer et al. | 260—43 |
| 2,683,697 | 7/54 | Newell et al. | 260—2.5 |
| 2,728,741 | 12/55 | Simon et al. | 260—2.5 |
| 2,732,368 | 1/56 | Shepard | 260—43 |
| 2,856,381 | 10/58 | McNaughtan | 260—838 |
| 2,985,614 | 10/61 | Bright | 260—29.3 |
| 2,993,871 | 7/61 | Shannon et al. | 260—2.5 |
| 2,999,833 | 9/61 | Bleuenstein | 260—38 |
| 3,002,948 | 10/61 | Lawther | 260—38 |

MURRAY TILLMAN, *Primary Examiner.*

MILTON STERMAN, LEON J. BERCOVITZ,
*Examiners.*